Aug. 28, 1956  J. JOHNSON  2,760,322
MOBILE STONE-GATHERING APPARATUS
Filed Oct. 7, 1955  8 Sheets-Sheet 1

INVENTOR.
JOHN JOHNSON,
BY
McMorrow, Berman & Davidson
ATTORNEYS.

Aug. 28, 1956   J. JOHNSON   2,760,322
MOBILE STONE-GATHERING APPARATUS
Filed Oct. 7, 1955   8 Sheets-Sheet 8

INVENTOR.
JOHN JOHNSON,
BY
McMorrow, Berman + Davidson
ATTORNEYS.

United States Patent Office 2,760,322
Patented Aug. 28, 1956

2,760,322

MOBILE STONE-GATHERING APPARATUS

John Johnson, Brockton, Mont.

Application October 7, 1955, Serial No. 539,089

4 Claims. (Cl. 55—17)

The present invention relates to a mobile stone-gathering apparatus.

An object of the present invention is to provide a mobile stone-gathering apparatus which is operable by a pushing force applied by a work vehicle and which has means for elevating and depositing the gathered stone in the vehicle body as the apparatus travels over a stone-containing ground surface.

Another object of the present invention is to provide a mobile stone-gathering apparatus which is caused to travel over a stone-containing ground surface by application of a pushing force thereto by a work vehicle and which is steered responsive to the application of such pushing force.

A further object of the present invention is to provide a mobile stone-gathering apparatus in which the operations of gathering, collecting, elevating, and dumping of the collected stones are effected responsive to the application of a pushing force by a work vehicle.

A still further object of the present invention is to provide a stone-gathering apparatus of sturdy construction, one simple in structure, one which is commercially practical, and one which is highly effective in action.

These and other objects and advantages of the present invention will be fully apparent from the following description when taken in connection with the annexed drawings, in which:

Referring in greater detail to the drawings in which like numerals indicate like parts throughout the several views, the stone-gathering apparatus of the present invention comprises a longitudinally-extending support member 12 having a forward end 13 and a rearward end 14. A beam 15 is arranged transversely of the support member 12 and has the portion adjacent one end 16 contiguous to and fixedly attached to the forward end 13 of the support member 12. The remaining part of the beam 15 between the attached portion at the one end 16 and the other end 17 thereof and the adjacent portion of the support member 12 forms a space of a size such as to acccommodate a pushing vehicle such as the dump truck 18 shown in full lines in Figures 1 to 3, inclusively and partially in dotted lines in Figure 8.

A horizontally-disposed shaft 19 is positioned forwardly of and in spaced parallel relation with respect to the beam 15 and is carried by the beam 15 and has one end 21 projecting beyond the end 16 of the beam 15 and has the other end 22 inwardly of and spaced from the end 17 of the beam 15. Specifically, the shaft 19 is carried by the beam 15 by means of a horizontally-disposed generally U-shaped frame 47 which is arranged so that one leg 48 thereof extends longitudinally of and is secured to the forward edge of the beam 15 and the other leg 49 is parallel to and spaced forwardly of the shaft 19, and the bight 47' underlies and is adjacent to the projecting end 21 of the shaft 19. A bearing support 21' rises from the bight 47' and supports the projecting end 21 of the shaft 19. An inverted U-shaped hanger 51 has the lower ends of one of its legs secured to the leg 48 intermediate the ends of the latter and has the lower end of the other of its legs secured to the free end of the leg 49 of the frame 47. Another bearing support 52 has its lower end secured to the leg 58 of the hanger 51 adjacent to the frame leg 49 and has its upper end supporting the other end 22 of the shaft 19. A rotatable wheel 23 is mounted upon and supports the projecting end 21 of the shaft 19.

An open-ended perforated drum 24 is circumposed about the shaft 19 inwardly of the end 22 and is connected to the shaft 19 for rotation in a clockwise direction therearound as an axis. A flat hollow open-ended tire 25 of a diameter larger than the drum 24 is arranged so that one of its open ends 26 is in registry with the open end 27 of the drum 24 adjacent the other end 17 of the beam 15 and is connected to the drum 24 for rotation with the latter rollably engaging a ground surface.

Figure 4:
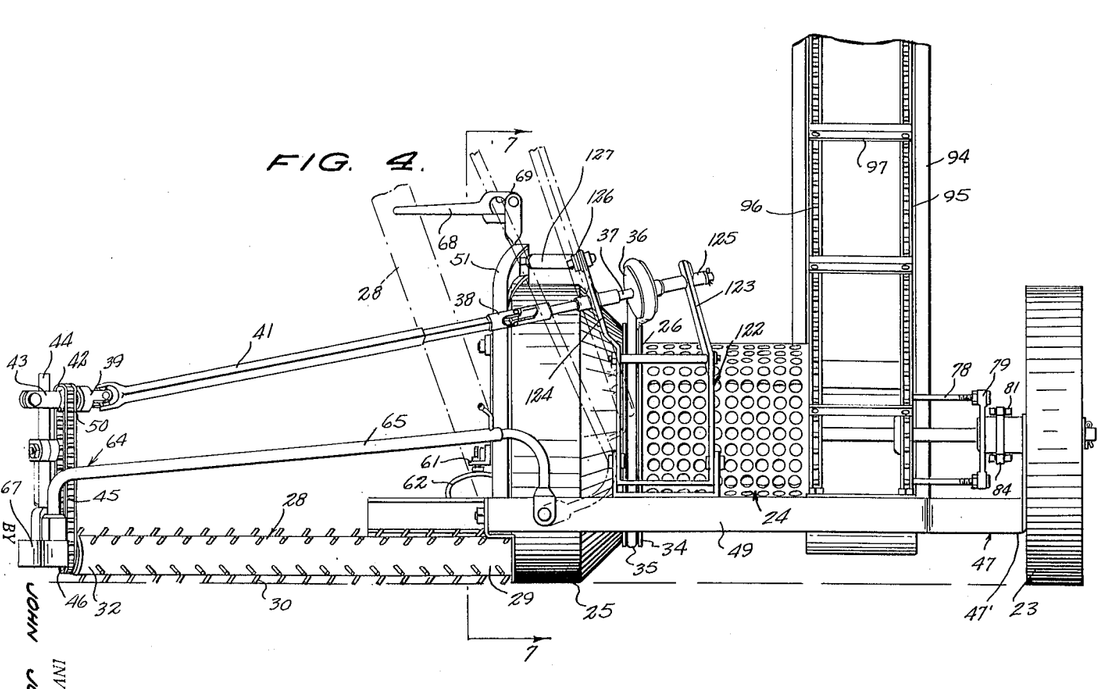
Figure 4 is a front elevational view, on an enlarged scale, of the assembly of Figure 1 with the truck omitted.

A horizontally-disposed rotatable stone-gathering implement 28 is positioned forwardly of and at an angle with respect to the beam 15 on the side adjacent the flat tire 25 with one end contiguous to the other open end 31 of the tire 25 and the other end forwardly of and spaced from the flat tire 25. The stone-gathering implement 28 consists in a cylinder having spaced stone-engaging prongs 30 projecting from its periphery and is circumposed about and fixedly secured to a shaft 55 which has one end projecting from the end portion 29 of the implement cylinder and supported in a bearing structure 54 which is pivotally secured to the lower end of an upright arm 53. The arm 53 is carried on the adjacent and free ends of a pair of horizontally-disposed bars 56 and 57. The other ends of the bars 56 and 57 are pivotally connected to the one leg 58 of the hanger 51. The free end of the bar 57 is provided with an extension 59 through which is threaded a bolt and lock nut assembly 61. The head of the bolt of the bolt and lock nut assembly 61 bears against the upper face of an arcuately-shaped cam member 62 and permits the adjustment of the implement one end portion 29 upwardly and downwardly with respect to the ground surface and the adjacent portion of the flat tire 25. The other end of the shaft 55 projects from the end portion 32 of the implement cylinder and is rotatably supported in a bearing block 67. An upstanding post 44 supports the bearing block 67 and is adjustably carried by the upper end of an upright arm 40 which carries the wheel 33 on its lower end for rolling movement over a ground surface. The implement 28 is normally in the horizontal position with the prongs 30 engaging the ground surface and is movable from the horizontal position to an upright direction position. The means connecting the implement 28 to the beam 15 for movement from the horizontal position to the upright position includes the one arm 63 of a Y-shaped support member 64 fixedly secured and formed integrally with the cam member 62. The arm 63 and the other arm 65 of the member 64 are pivotally connected to the legs 48 and 49 of the frame 47, respectively. The arms 63 and 65 converge as at 66 in Figure 1 and a downwardly-turned extension of the arms 63 and 65 is fixedly secured in the bearing block 67. The pivotal connection of the arms 63 and 65 with the frame legs 48 and 49, respectively, permits the swinging movement of the support member 64 and the implement 28 upwardly to the upright direction position shown in dotted lines in Figure 4. Means is provided for holding the implement in the upright direction position, such means embodying a latch element 68 having a recess 69 receiving the adjacent portion of the arm 63. The latch element 68 is pivotally connected to an upwardly-extending bracket 71 fixedly secured to the bight of the hanger 51.

Means connects the implement 28 to the flat tire 25 for rotation in a counterclockwise direction responsive to rotation of the flat tire 25 in a clockwise direction. Specifically, this means comprises, as seen most clearly in Figure 4, a pulley 34 circumposed about the drum 24 adjacent the end 26 of the latter and secured thereto which is drivingly connected to a pulley 36 on the shaft 37 rotatably supported in an upstanding frame 122 carried by the leg 49 of the hanger 51 by means of a belt 35. The upper portions of the legs 123 and 124 of the frame 122 are bent inwardly over the drum 24. A bearing 125 on the leg 123 supports one end of the shaft 37 and another bearing 126 on the leg 124 supports the intermediate portion of the shaft 37. A brace 127 has one end attached to the leg 124 and a threaded rod 128 with a locking nut 129 extends from the other end of the brace 127 and is secured in a hole in the bight of the hanger 51 for adjusting the tension of the belt 35. A universal joint 38 drivingly connects the other end of the shaft 37 to one end of a telescopic shaft 41 and another universal joint 39 drivingly connects the other end of the shaft 41 to a stub shaft 50 which is supported for rotation in a support bracket 43 adjustably secured to the post 44. A sprocket gear 42 on the stub shaft 50 is drivingly connected to another sprocket gear 46 by means of a drive chain 45, the sprocket gear 46 being secured to the projecting end of shaft 55 adjacent the end portion 32 of the implement cylinder. The belt 35 is given a half twist so that clockwise rotation of the drum 24 results in counterclockwise rotation of the pulley 36 and counterclockwise rotation of the implement 28.

Guiding means is provided in the tire 25 for directing stones from the stone-gathering implement 28 to the end 26 of the drum adjacent the end 17 of the beam 15. Specifically, such means embodies a plurality of spirally-shaped ribs 72 extending inwardly from the inner wall of the tire 25 and are so arranged as to deliver stones received in the open end 31 of the tire 25 to the open end 27 of the drum 24.

A cylindrical open-ended cage 73 is arranged so that one of its open ends is adjacent the other open end 74 of the drum 24 and is in alignment with the end 74 of the drum 24 adjacent the one end 16 of the beam 15 and is connected to the drum 24 for rotation with the latter.

Feeding means consisting in other spirally-shaped ribs 75 projecting inwardly of the wall of the drum 24 directs the stones received from the flat tire 25 to the cage 73. The feeding means interiorly of the drum 24 consisting in the ribs 75 are formed integrally with the ribs 72 within the tire 25.

Figure 1:
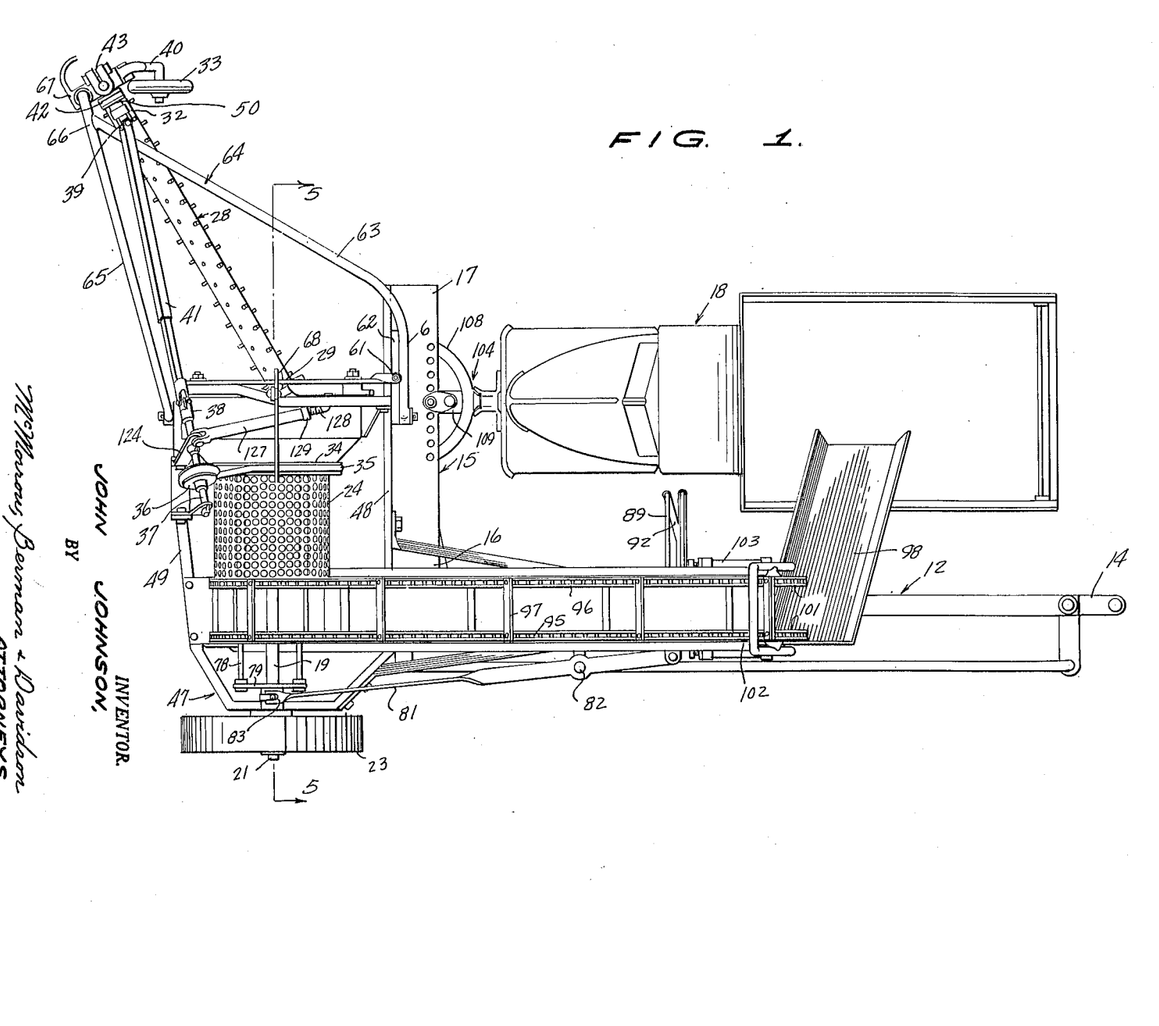
Figure 1 is a plan view of the mobile stone-gathering apparatus of the present invention, showing a truck in position for pushing the apparatus.
Figure 5:
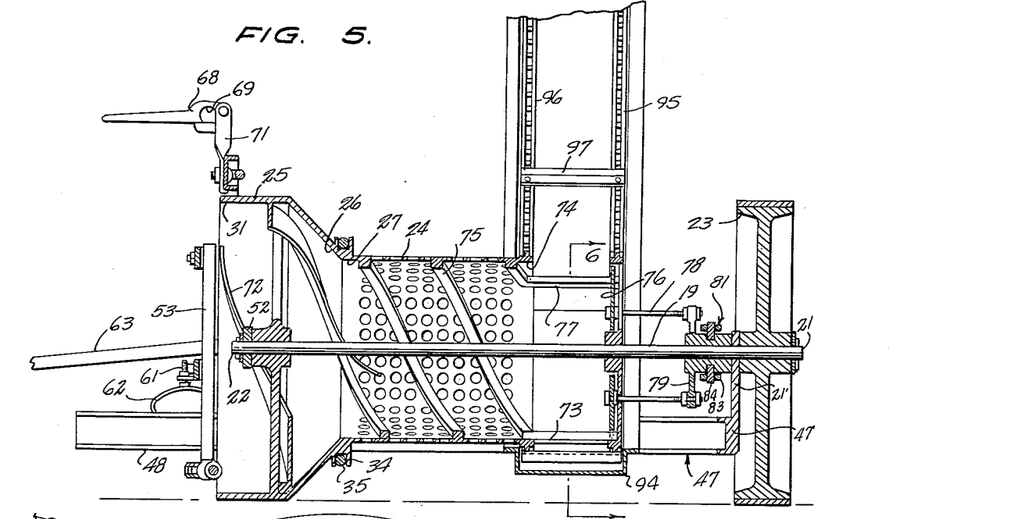
Figure 5 is a fragmentary sectional view, on an enlarged scale, taken on the line 5—5 of Figure 1.
Figure 6:
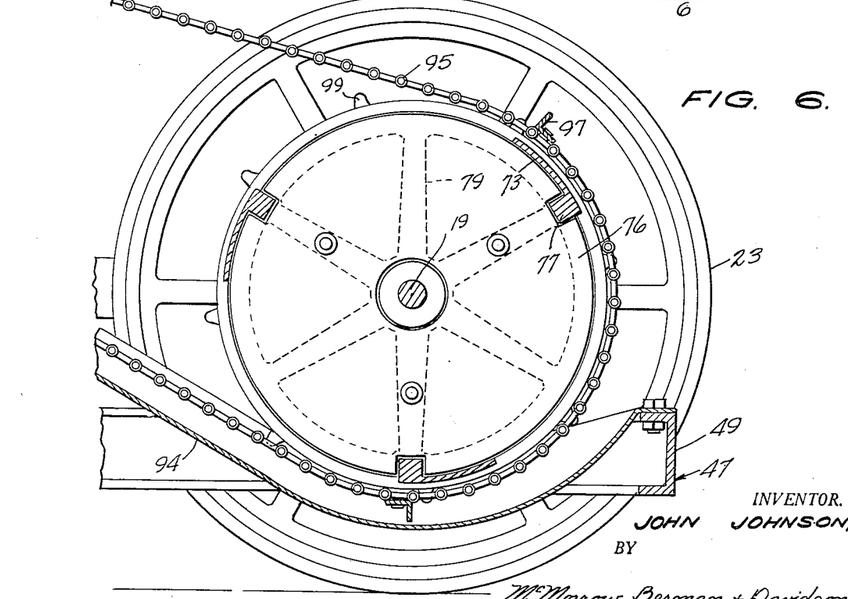
Figure 6 is a fragmentary sectional view, on an enlarged scale, taken on the line 6—6 of Figure 5.
Figure 7:
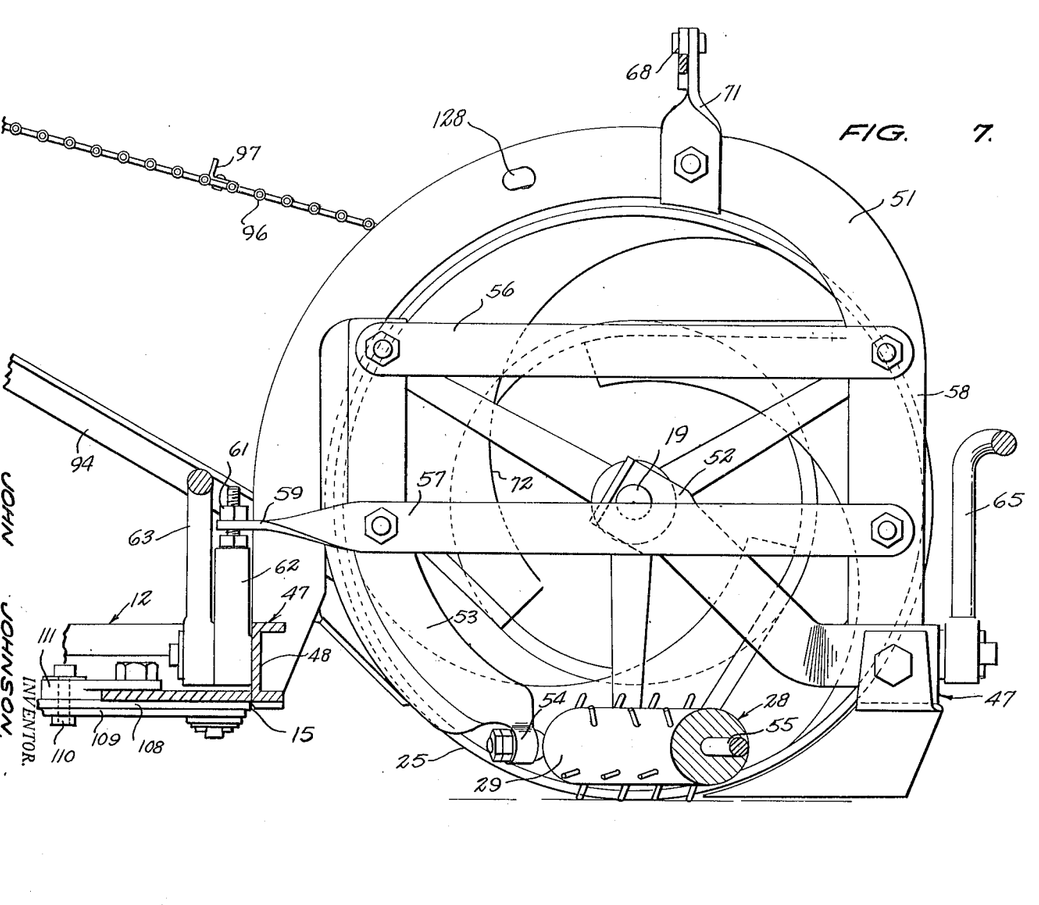
Figure 7 is a fragmentary sectional view, on an enlarged scale, taken on the line 7—7 of Figure 4.
Figure 10:
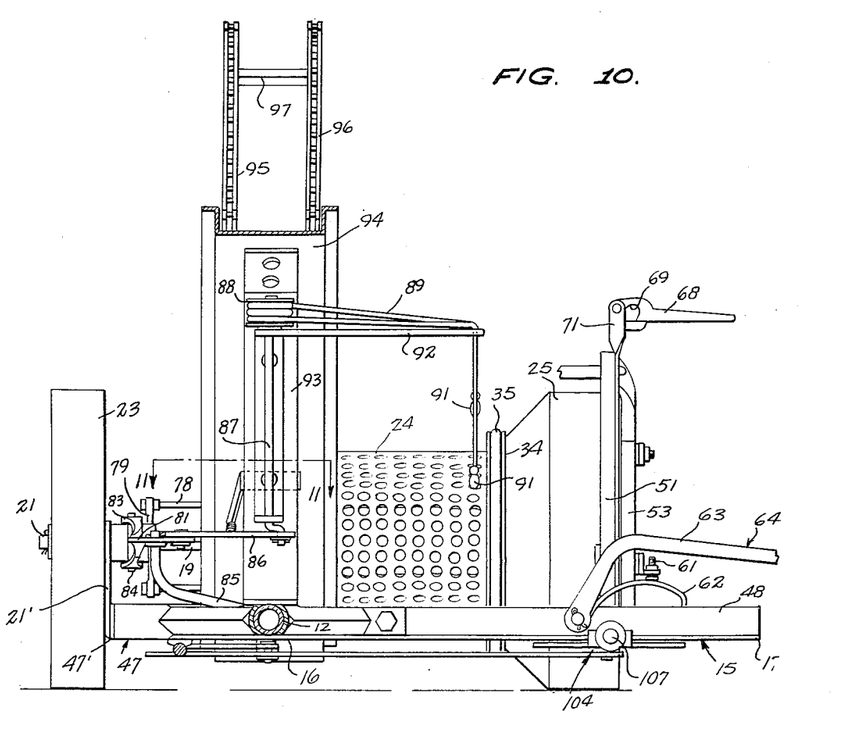
Figure 10 is a fragmentary view, on an enlarged scale, taken on the line 10—10 of Figure 2.
Figure 11:
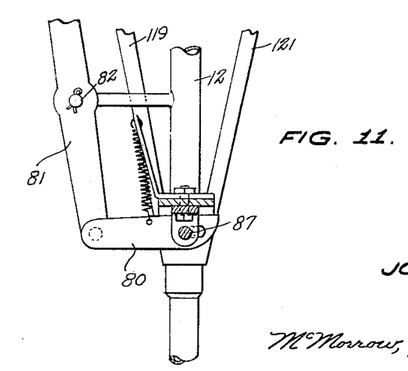
Figure 11 is a fragmentary view, on an enlarged scale, taken on the line 11—11 of Figure 10.

A gate 76 normally closes the other end of the cage 73 remote from the open end 74 of the drum 24 and is mounted upon the shaft 19 for sliding movement from the position closing the other end of the cage 73 to a position closing the open end 74 of the drum 24 adjacent the end 16 of the beam 15. Extensions 77 upon the ends of the ribs 75 form guide means for the gate 76 within the cage 73 and also serve to reinforce the plate portions of the cage 73 as shown most clearly in Figures 5 and 6. The gate 76 is mounted upon the free ends of three rods 78 which are supported by their other ends in the spider 79 which is slidably mounted upon the shaft 19. As seen in Figures 1 and 5, a fork member 81 pivotally connected as at 82 to the support member 12 has its bifurcated end 83 engaging shift pins 84 carried on the spider 79. As shown in Figure 10 an upwardly-directed arm 85 having its lower end fixedly secured to the support member 12 supports the pivotal connection 82 of the fork member 81. A link 86 has one end connected to the other end of the fork member 81 and has its other end mounted upon the lower end of an upright crank arm 87. A drum 88 upon the upper end of the crank arm 87 carries the intermediate portion of a rope 89 the free ends of which extend downwardly and terminate in handles 91. A bracket 92 projects from an upright post 93 which has its lower end mounted upon the support member 12 and carries on its upper end the web of a trough or channel member 94. Holes are provided in the end of the bracket 92 for the portions of the rope 89 inwardly of the handles 91 and the bracket 92 supports the end portions of the rope within reach of the driver of the truck 18, as shown in Figure 1.

A conveying means is positioned longitudinally of and extends in an upwardly sloping direction from the cage 73 and has its lower end connected in communication with the cage 73. Specifically, the conveying means embodies a pair of parallel endless chains 95 and 96 arranged in spaced relation and connected by a plurality of angle iron members 97 arranged in spaced relation along the chains 95 and 96, the angle iron members 97 sliding in the channel member 94 and carrying the stones received from the cage 73 to the upper end of the channel member 94. The lower end of the channel member 94 is fixedly secured to the frame leg 49. A downwardly-directed chute 98 is positioned transversely of the conveying means embodying the chains 95 and 96 and the members 97 adjacent the upper end of the conveying means and has its upper end connected in communication with the upper end of the conveying means. The lower end of the chute 98 is open and is at a level for discharge in the body of the truck 18 when the truck 18 is in the space formed by the portion of the beam 15 between the ends 16 and 17 and the adjacent portion of the support member 12. The peripheries of the sides of the cage 73 are each provided with outwardly-projecting bosses 99 arranged in spaced relation for driving engagement of the chains 95 and 96. The upper end portions of the chains 95 and 96 are carried on a pair of sprocket wheels 101 mounted upon a shaft (not shown) which has its ends journaled in the legs of an inverted U-shaped bar 102, the legs of the bar 102 being each mounted in a cylinder 103. A means for adjusting the tension of the chains 95 and 96 connects the legs of the bar 102 to the respective cylinders 103. Such means includes threads upon the exterior surface of the legs of the bar 102 and suitable threaded locking means secured to the cylinders 103.

A coupling element indicated generally by the reference numeral 104 projects from the remaining part of the beam 15 inwardly of the end 17 of the latter and is connected to the beam 15 for movement longitudinally of the remaining part of the beam in an arcuate path. The pushing vehicle or truck 18 attaches to the coupling element when it is in the position within the space provided by the remaining part of the beam 15 and the adjacent portion of the support member 12.

Figures 8, 9:
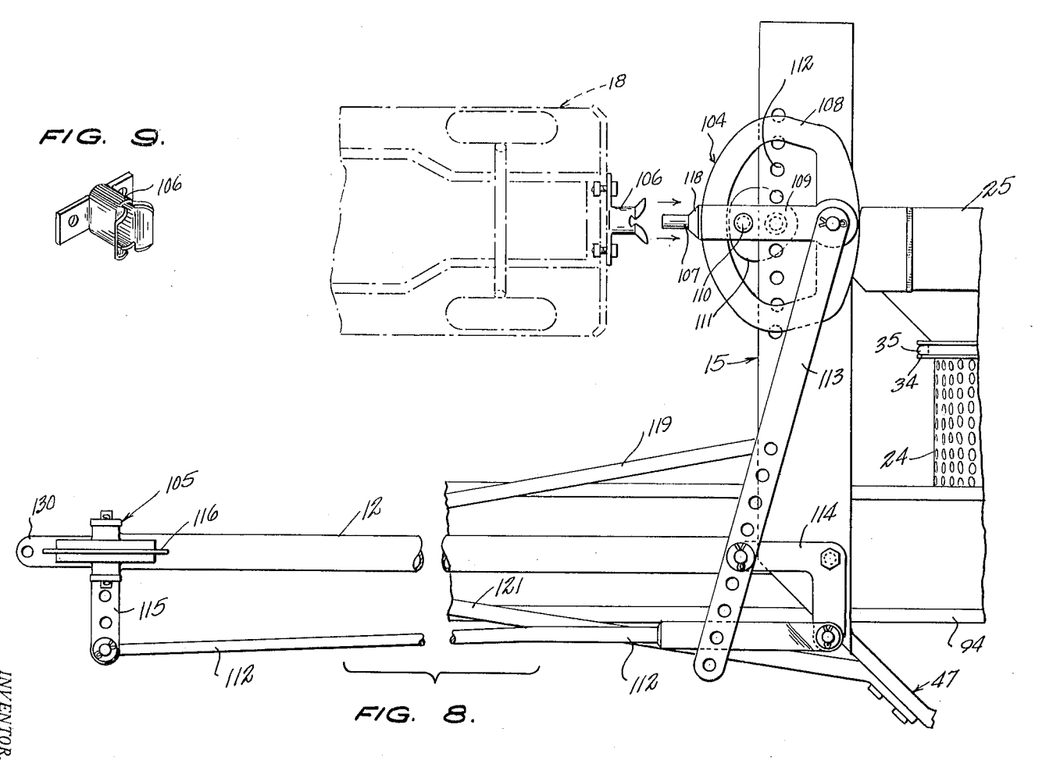
Figure 8 is a plan view, on an enlarged scale, of a portion of the assembly of Figure 1 showing the coupling means for pushing the apparatus by a truck, the latter being partially shown in dotted lines, the portion of the assembly being shown in bottom view.
Figure 9 is an isometric view, on an enlarged scale, of a part of the coupling means shown in Figure 8.

A steerable wheel assembly 105 supports the rearward end of the support member 12 and is operatively connected to the coupling element 104 for movement with the latter. The steerable wheel assembly and the coupling element are shown in Figure 8 and are seen to include a socket member 106 attached to the bumper of the truck 18 at the forward end of the latter and receiving the horizontally-disposed pin 107 which projects rearwardly from the outer edge of the rearwardly one of the straightaway portions of an oval-shaped track 108. An arm 109 is positioned transversely of and beneath and spaced from the under face of the beam 15 and is pivotally connected inwardly of its rearward end as at 110 to the under face of a bracket 111 which is secured in one of a series of holes 112 in the plate 15. The track 108 is disposed in superimposed relation with respect to the arm 109 between the arm 109 and the under face of the beam 15 and has its other and forwardly-disposed straightaway portion pivotally connected intermediate its ends to the forward end of the arm 109. A lever 113 extending longitudinally of the beam 15 has one end pivotally connected to the arm 109 at the same point of pivotal connection of the arm 109 to the forwardly-disposed straightaway portion of the track 108. The other end of the lever 113 is connected to the free end of one of the legs of an L-shaped lever 114. The free end of the other leg of the lever 114 is connected to the forward end of a longitudinally-extending pitman arm 112. The rearward end of the pitman arm 112 is connected to the free end of a steering arm 115 which is part of the steerable wheel assembly 105. The wheel 116 of the steerable wheel assembly 105 is supported upon a hanger 117 and is connected for steering movements to the steering arm 115. The free end of the arm 109 adjacent to the pin 107 is abuttingly engaged by a shoulder 118 formed integrally with the pin 107 and the track 108 and serves to absorb some of the thrust of the pushing vehicle or truck 18, transmitting such thrust through the point of pivotal connection of the arm 109 to the beam 15.

It will also be seen in Figure 8 that the support member 12 is braced by longitudinally-extending brace rods 119 and 121 connected to the beam 15 at their forward ends.

Figure 2:
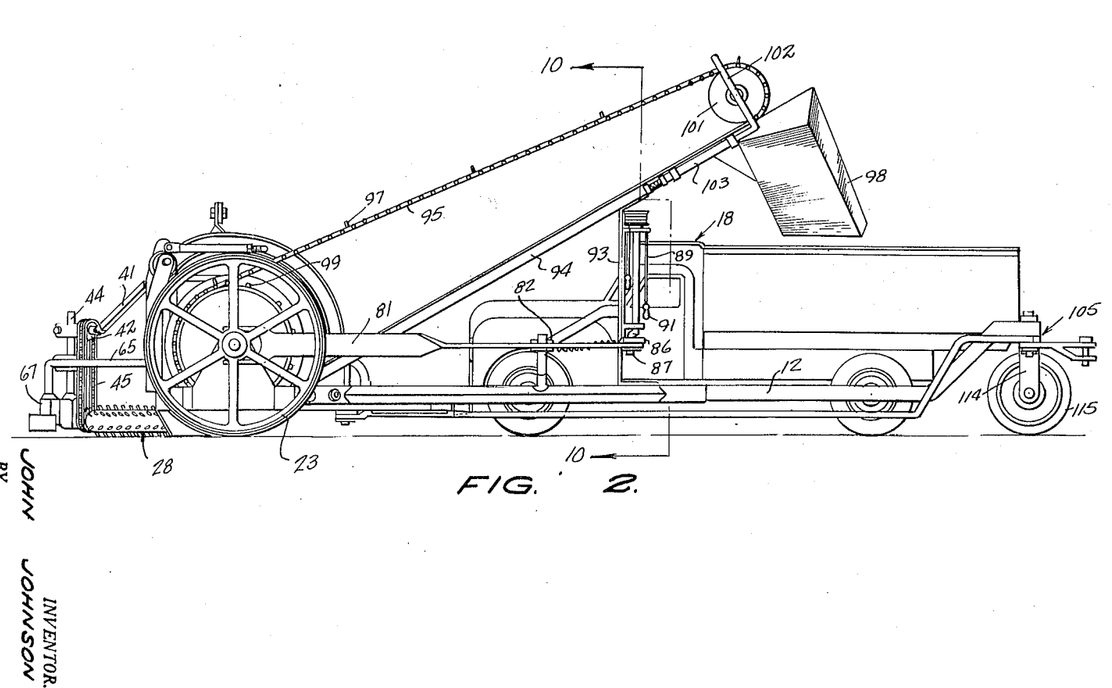
Figure 2 is a side elevational view of the assembly of Figure 1.
Figure 3:
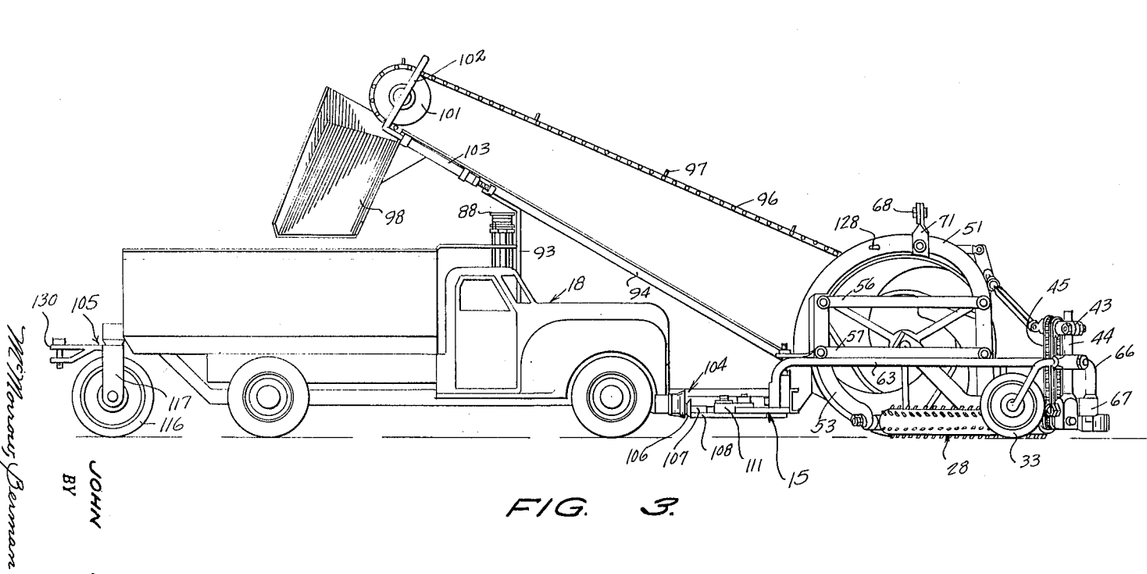
Figure 3 is another side elevational view of the assembly of Figure 1 taken on the side opposite to that of Figure 2.

In Figures 2 and 8 it will be seen that a conventional hitch assembly 130 extends from the rearwardly end of the steerable wheel assembly 105 and provides a means by which the apparatus of the present invention may be towed to the agricultural field from which the stones are to be removed. When towed by the hitch assembly 130 the implement 28 is first raised to its upright direction position and held by the latch element 68 in that position. Upon swinging movement upwardly of the arm 63 and 65 to the position in which the arm 63 is engaged in the latch element, the cam member 62 shifts the upright arm 53 upwardly to move the end portion 29 of the implement 28 upwardly out of its ground-engaging position.

In operation, the stone-gathering apparatus is towed by the hitch assembly 130 to the field from which the stones are to be gathered and the truck or other pushing vehicle carrying the socket member 106 is positioned in the space between the intermediate part of the bar 15 and the adjacent portion of the support member 12 with the socket member 106 receiving the pin 107. Upon forward movement of the truck 18, the apparatus is pushed across the surface of the field with the stone-gathering implement in its horizontal position engaging the ground and raking and digging stones from the ground and moving them into the open end of the tire 25 from where they are carried into the drum 24. As it has been found that clods of dirt and lumps of clay and other materials are gathered with the stones, such clods and clay will be ground by the stones within the drum and not delivered to the conveying means if the gate 76 is held in its position closing the open end 74 of the drum 24. When a sufficient number of stones have been received within the drum 24 and the dirt carried therein with the stones has been ground and discharged through the perforations in the drum 24, the gate 76 is then opened permitting the gathered stones to drop through the open portions of the cage 73 on to the channel member 94 which extends under the cage 73. The stones are then carried upwardly and discharged into the chute 98 from which they are delivered into the body of the truck 18. When a sufficient number of stones has been gathered, the truck 18 merely backs away from the apparatus and carries the stones to a place of disposal. The arrangement of the coupling element 104 permits the steering of the apparatus by the motion of the truck 18. Upon shifting or steering of the truck 18 closer to the support member 12 the wheel 116 in the steerable wheel assembly 105 will be turned so that the apparatus turns to the left. Upon shifting of the truck 18 outwardly from the support member 12 the wheel 116 will be turned so that the apparatus will turn to the right. This action permits the guiding of the stone-gathering apparatus of the present invention by the steering of the truck 18 without other attention.

What is claimed is:

1. A mobile stone-gathering apparatus comprising a longitudinally-extending support member having a forward end and a rearward end, a beam arranged transversely of said support member and having the portion adjacent one end thereof contiguous to and fixedly attached to the forward end of said support member, the remaining part of said beam between said attached portion and the other end thereof and the adjacent portion of said support member forming a space of a size such as to accommodate a pushing vehicle, a horizontally-disposed shaft positioned forwardly of and in spaced parallel relation with respect to said beam and carried by the beam and having one end projecting beyond said one end of said beam and having the other end inwardly of and spaced from the other end of said beam, a rotatable wheel supporting the projecting one end of said shaft, an open-ended perforated drum circumposed about said shaft inwardly of the other end thereof and connected to said shaft for rotation in a clockwise direction therearound as an axis, a flat hollow open-ended tire of a diameter larger than said drum arranged so that one of its open ends is in registry with the open end of said drum adjacent the other end of said beam and connected to said drum for rotation with the latter rollably engaging a ground surface, a horizontally-disposed rotatable stone-gathering implement positioned forwardly of and at an angle with respect to said beam on the side adjacent said flat tire with the one end contiguous to the other open end of said flat tire and the other end forwardly of and spaced from said flat tire and supported by said beam, a wheel supporting the other end of said implement, said implement being engageable with said ground surface, means connecting said implement to said flat tire for rotation in counter-clockwise direction responsive to rotation of said flat tire in clockwise direction, guiding means in said flat tire for directing stones from said stone-gathering implement to the end of said drum adjacent the other end of said beam, a cylindrical open-ended cage arranged so that one of its open ends is in alignment with the other open end of said drum adjacent said one end of said beam and connected to said drum for rotation with the latter, a conveying means positioned longitudinally of and extending in an upwardly-sloping direction from said cage and having the lower end connected in communication with said cage, a downwardly-directed chute positioned transversely of said conveying means adjacent the upper end of the latter and having the upper end connected in communication with the upper end of said conveying means, the lower end of said chute being at a level for discharge in the body of a pushing vehicle when positioned in said space, a coupling element projecting from and carried by the remaining part of said beam inwardly of the other end of the latter for attachment of a pushing vehicle thereto when positioned in said space, and a steerable wheel assembly supporting the rearward end of said support member.

2. A mobile stone-gathering apparatus comprising a longitudinally-extending support member having a forward end and a rearward end, a beam arranged transversely of said support member and having the portion adjacent one end thereof contiguous to and fixedly attached to the forward end of said support member, the remaining part of said beam between said attached portion and the other end thereof and the adjacent portion of said support member forming a space of a size such as to accommodate a pushing vehicle, a horizontally-disposed shaft positioned forwardly of and in spaced parallel relation with respect to said beam and carried by the beam and having one end projecting beyond said one end of said beam and having the other end inwardly of and spaced from the other end of said beam, a rotatable wheel supporting the projecting one end of said shaft, an open-ended perforated drum circumposed about said shaft inwardly of the other end thereof and connected to said shaft for rotation in a clockwise direction therearound as an axis, a flat hollow open-ended tire of a diameter larger than said drum arranged so that one of its open ends is in registry with the open end of said drum adjacent the other end of said beam and connected to said drum for rotation with the latter rollably engaging a ground surface, a horizontally-disposed rotatable stone-gathering implement positioned forwardly of and at an angle with respect to said beam on the side adjacent said flat tire with the one end contiguous to the other open end of said flat tire and the other end forwardly of and spaced from said flat tire and supported by said beam, a wheel supporting the other end of said implement, said implement being engageable with said ground surface, means connecting said implement to said flat tire for rotation in counterclockwise direction responsive to rotation of said flat tire in clockwise direction, guiding means in said flat tire for directing stones from said stone-gathering implement to the end of said drum adjacent the other end of said beam, a cylindrical open-ended cage arranged so that one of its open ends is in alignment with the open end of said drum adjacent said one end of said beam and connected to said drum for rotation with the latter, a feeding means interiorly of said drum for directing the stones to said cage, a conveying means positioned longitudinally of and extending in an upwardly-sloping direction from said cage and having the lower end connected in communication with said cage, a downwardly-directed chute positioned transversely of said conveying means adjacent the upper end of the latter and having the upper end connected in communication with the upper end of said conveying means, the lower end of said chute being at a level for discharge in the body of a pushing vehicle when positioned in said space, a coupling element projecting from the remaining part of said beam inwardly of the other end of the latter and connected to said beam for movement longitudinally of said part in an arcuate path for attachment of a pushing vehicle thereto when positioned in said space, and a steerable wheel assembly supporting the rearward end of said support member and operatively connected to said coupling element for movement with the latter.

3. A mobile stone-gathering apparatus comprising a longitdinally extending support member having a forward end and a rearward end, a beam arranged transversely of said support member and having the portion adjacent one end thereof contiguous to and fixedly attached to the forward end of said support member, the remaining part of said beam between said attached portion and the other end thereof and the adjacent portion of the said support member forming a space of a size such as to accommodate a pushing vehicle, a horizontally-disposed shaft positioned forwardly of and in spaced parallel relation with respect to said beam and carried by the beam and having one end projecting beyond said one end of said beam and having the other end inwardly of and spaced from the other end of said beam, a rotatable wheel supporting the projecting one end of said shaft, an open-ended perforated drum circumposed about said shaft inwardly of the other end thereof and connected to said shaft for rotation in a clockwise direction therearound as an axis, a flat hollow open-ended tire of a diameter larger than said drum arranged so that one of its open ends is in registry with the open end of said drum adjacent the other end of said beam and connected to said drum for rotation with the latter rollably engaging a ground surface, a horizontally-disposed rotatable stone-gathering implement positioned forwardly of and at an angle with respect to said beam on the side adjacent said flat tire with the one end contiguous to the other open end of said flat tire and the other end forwardly of and spaced from said flat tire and supported by said beam, a wheel supporting the other end of said implement, said implement being engageable with said ground surface, means connecting said implement to said flat tire for rotation in counterclockwise direction responsive to rotation of said flat tire in clockwise direction, guiding means in said flat tire for directing stones from said stone-gathering implement to the end of said drum adjacent the other end of said beam, a cylindrical open-ended cage arranged so that one of its open ends is in alignment with the open end of said drum adjacent said one end of said beam and connected to said drum for rotation with the latter, a gate normally closing the other end of said cage and mounted on said shaft for sliding movement from the position closing the other end of said cage to a position closing the open end of said drum adjacent said one end of said beam, a conveying means positioned longitudinally of and extending in an upwardly-sloping direction from said cage and having the lower end connected in communication with said cage, a downwardly-directed chute positioned transversely of said conveying means adjacent the upper end of the latter and having the upper end connected in communication with the upper end of said conveying means, the lower end of said chute being at a level for discharge in the body of a pushing vehicle when positioned in said space, a coupling element projecting from and carried by the remaining part of said beam inwardly of the other end of the latter for attachment of a pushing vehicle thereto when positioned in said space, and a steerable wheel assembly supporting the rearward end of said support member.

4. A mobile stone-gathering apparatus comprising a longitudinally extending support member having a forward end and a rearward end, a beam arranged transversely of said support member and having the portion adjacent one end thereof contiguous to and fixedly attached to the forward end of said support member, the remaining part of said beam between said attached portion and the other end thereof and the adjacent portion of the said support member forming a space of a size such as to accommodate a pushing vehicle, a horizontally-disposed shaft positioned forwardly of and in spaced parallel relation with respect to said beam and carried by the beam and having one end projecting beyond said one end of said beam and having the other end inwardly of and spaced from the other end of said beam, a rotatable wheel supporting the projecting one end of said shaft, an open-ended perforated drum circumposed about said shaft inwardly of the other end thereof and connected to said shaft for rotation in a clockwise direction therearound as an axis, a flat hollow open-ended tire of a diameter larger than said drum arranged so that one of its open ends is in registry with the open end of said drum adjacent the other end of said beam and connected to said beam for rotation with the latter rollably engaging a ground surface, a horizontally-disposed rotatable stone-gathering implement positioned forwardly of and at an angle with respect to said beam on the side adjacent said flat tire with the one end contiguous to the other open end of said flat tire and the other end forwardly of and spaced from said flat tire and supported by said beam, a wheel supporting the other end of said implement, said implement being engageable with said ground surface, means connecting said implement to said flat tire for rotation in counterclockwise direction responsive to rotation of said flat tire in clockwise direction, said stone-gathering implement being connected to said beam for movement from its horizontal position to an upright direction position, means for holding said implement in its upright direction position, guiding means in said flat tire for directing stones from said stone-gathering implement to the end of said drum adjacent the other end of said beam, a cylindrical open-ended cage arranged so that one of its open ends is in alignment with the open end of said drum adjacent said one end of said beam and connected to said drum for rotation with the latter, a conveying means positioned longitudinally of and extending in an upwardly-sloping direction from said cage and having the lower end connected in communication with said cage, a downwardly-directed chute positioned transversely of said conveying means adjacent the upper end of the latter and having the upper end connected in communication with the upper end of said conveying means, the lower end of said chute being at a level for discharge in the body of a pushing vehicle when positioned in said space, a coupling element projecting from and carried by the remaining part of said beam inwardly of the other end of the latter for attachment of a pushing vehicle thereto when positioned in said space, and a steerable wheel assembly supporting the rearward end of said support member.

No references cited.